United States Patent
Hwang (10) Patent No.: US 7,606,708 B2
(45) Date of Patent: Oct. 20, 2009

(54) APPARATUS, METHOD, AND MEDIUM FOR GENERATING GRAMMAR NETWORK FOR USE IN SPEECH RECOGNITION AND DIALOGUE SPEECH RECOGNITION

(75) Inventor: Kwangil Hwang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 221 days.

(21) Appl. No.: 11/344,163

(22) Filed: Feb. 1, 2006

(65) Prior Publication Data

US 2006/0173686 A1     Aug. 3, 2006

(30) Foreign Application Priority Data

Feb. 1, 2005     (KR)  ............ 10-2005-0009144

(51) Int. Cl.
*G10L 15/00*     (2006.01)
*G10L 21/00*     (2006.01)

(52) U.S. Cl. .................. 704/257; 704/270; 704/275

(58) Field of Classification Search ............. 704/257, 704/270, 275
See application file for complete search history.

(56) References Cited

U.S. PATENT DOCUMENTS

| | | | | |
|---|---|---|---|---|
| 5,615,296 A | * | 3/1997 | Stanford et al. | 704/270.1 |
| 5,748,841 A | * | 5/1998 | Morin et al. | 704/257 |
| 5,774,628 A | * | 6/1998 | Hemphill | 704/255 |
| 6,067,520 A | * | 5/2000 | Lee | 704/270 |

(Continued)

FOREIGN PATENT DOCUMENTS

| KR | 2001-0073506 | 8/2001 |
|---|---|---|
| KR | 2004-0115069 | 12/2004 |

OTHER PUBLICATIONS

B Souvignier et al., "The Thoughtful Elephant: Strategies for Spoken Dialog Systems", IEEE trans. on speech and audio processing, vol. 8, No. 1, pp. 51-62, 2000.*

(Continued)

*Primary Examiner*—Richemond Dorvil
*Assistant Examiner*—Jialong He
(74) *Attorney, Agent, or Firm*—Staas & Halsey LLP (57) ABSTRACT

A method, apparatus, and medium for generating a grammar network for speech recognition and a dialogue speech recognition are provided. A method, apparatus, and medium for employing the same are provided. The apparatus for generating a grammar network for speech recognition includes: a dialogue history storage unit storing a dialogue history between a system and a user; a semantic map formed by clustering words forming each dialogue sentence included in a dialogue sentence corpus depending on semantic correlation, and generating a first candidate group formed of a plurality of words having the semantic correlation extracted for each word forming a dialogue sentence provided from the dialogue history storage unit; a sound map formed by clustering words forming each dialogue sentence included in the dialogue sentence corpus depending on acoustic similarity, and generating a second candidate group formed of a plurality of words having an acoustic similarity extracted for each word forming the dialogue sentence provided from the dialogue history storage unit and each word of the first candidate group; and a grammar network construction unit constructing a grammar network by combining the first candidate group and the second candidate group.

21 Claims, 3 Drawing Sheets

U.S. PATENT DOCUMENTS

| | | | |
|---|---|---|---|
| 6,154,722 A * | 11/2000 | Bellegarda | 704/257 |
| 6,167,377 A * | 12/2000 | Gillick et al. | 704/240 |
| 6,324,513 B1 * | 11/2001 | Nagai et al. | 704/275 |
| 6,418,431 B1 * | 7/2002 | Mahajan et al. | 707/4 |
| 6,499,013 B1 * | 12/2002 | Weber | 704/257 |
| 6,934,683 B2 * | 8/2005 | Ju et al. | 704/257 |
| 7,120,582 B1 * | 10/2006 | Young et al. | 704/255 |
| 7,177,814 B2 * | 2/2007 | Gong et al. | 704/270.1 |
| 7,299,181 B2 * | 11/2007 | Ju et al. | 704/257 |
| 2002/0013705 A1 * | 1/2002 | Jaepel et al. | 704/252 |
| 2002/0087312 A1 * | 7/2002 | Lee et al. | 704/251 |
| 2002/0178005 A1 * | 11/2002 | Dusan et al. | 704/254 |
| 2004/0098263 A1 * | 5/2004 | Hwang et al. | 704/266 |
| 2005/0043953 A1 * | 2/2005 | Winterkamp et al. | 704/275 |

OTHER PUBLICATIONS

R. Kneser et al., "Semantic clustering for adaptive language modelling", IEEE, Proc. ICASSP'97, pp. 779-782, 1997.*

Chung et al. "A dynamic vocabulary spoken dialogue interfeace," ICSLP, 2004.*

U.S. Appl. No. 11/263,826, filed Nov. 2, 2005, Hwang.

* cited by examiner

FIG. 4

APPARATUS, METHOD, AND MEDIUM FOR GENERATING GRAMMAR NETWORK FOR USE IN SPEECH RECOGNITION AND DIALOGUE SPEECH RECOGNITION

CROSS-REFERENCE TO RELATED APPLICATIONS

This application claims the benefit of Korean Patent Application No. 10-2005-0009144, filed on Feb. 1, 2005, in the Korean Intellectual Property Office, the disclosure of which is incorporated herein in its entirety by reference.

BACKGROUND OF THE INVENTION

1. Field of the Invention

The present invention relates to speech recognition, and more particularly, to an apparatus and method for adaptively and automatically generating a grammar network for use in speech recognition based on contents of previous dialogue, and an apparatus and method for recognizing dialogue speech by using the grammar network for speech recognition.

2. Description of the Related Art

Among grammar generation algorithms used in a decoder among elements of a speech recognition apparatus such as a virtual machine and a computer, well-known methods, such as an n-gram method, a hidden Markov model (HMM) method, a speech application programming interface (SAPI), a voice eXtensible markup language (VXML), and a speech application language tags (SALT) method, are used. In the n-gram method, real-time discourse information between a speech recognition apparatus and a user is not reflected in utterance prediction. In the HMM method, each moment of utterance by a user is assumed as an individual probability event completely independent from other utterance moments of the user or a speech recognition apparatus. Meanwhile, in the SAPI, VXML, and SALT methods, a predefined grammar in a simple prefixed discourse is loaded on predefined time points.

As a result, when the content of utterance by a user falls outside of a predefined standard grammar structure, it becomes difficult for the speech recognition apparatus to recognize the utterance of the user, and therefore the speech recognition apparatus prompts the user to utter again. In conclusion, the time taken by the speech recognition apparatus to recognize the utterance of the user becomes longer such that the dialogue between the speech recognition apparatus and the user becomes unnatural as well as tedious.

Furthermore, a grammar network generation method of the n-gram method using a statistical model may be appropriate to a grammar network generator of a speech recognition apparatus for dictation utterance, but it is not appropriate to that for a speech recognition apparatus for conversational utterance due to a drawback that real-time discourse information is not utilized for utterance prediction. In addition, grammar network generation methods of the SAPI, VXML and SALT methods that employ a context free grammar (CFG) using a computational language model may be appropriate to a grammar network generator of a speech recognition apparatus for command and control utterance, but these are not appropriate for conversational utterance due to a drawback that the discourse and speech content of the user cannot go beyond a pre-designed fixed discourse.

SUMMARY OF THE INVENTION

Additional aspects, features, and/or advantages of the invention will be set forth in part in the description which follows and, in part, will be apparent from the description, or may be learned by practice of the invention.

The present invention provides an apparatus, method, and medium for adaptively and automatically generating a grammar network for speech recognition based on contents of previous dialogue.

The present invention also provides an apparatus, method, and medium for performing dialogue speech recognition by using a grammar network for speech recognition generated adaptively and automatically based on contents of previous dialogue.

According to an aspect of the present invention, there is provided an apparatus for generating a grammar network for speech recognition including: a dialogue history storage unit storing a dialogue history between a system and a user; a semantic map formed by clustering words forming each dialogue sentence included in a dialogue sentence corpus depending on semantic correlation, and generating a first candidate group formed of a plurality of words having the semantic correlation extracted for each word forming a dialogue sentence provided from the dialogue history storage unit; a sound map formed by clustering words forming each dialogue sentence included in the dialogue sentence corpus depending on acoustic similarity, and generating a second candidate group formed of a plurality of words having an acoustic similarity extracted for each word forming the dialogue sentence provided from the dialogue history storage unit and each word of the first candidate group; and a grammar network construction unit constructing a grammar network by combining the first candidate group and the second candidate group.

According to another aspect of the present invention, there is provided a method of generating a grammar network for speech recognition including: forming a semantic map by clustering words forming each dialogue sentence included in a dialogue sentence corpus depending on semantic correlation; forming an acoustic map by clustering words forming each dialogue sentence included in the dialogue sentence corpus depending on acoustic similarity; activating the semantic map and generating a first candidate group formed of a plurality of words having the semantic correlation extracted for each word forming a dialogue sentence included in a dialogue history performed between a system and a user; activating the acoustic map and generating a second candidate group formed of a plurality of words having an acoustic similarity extracted for each word forming the dialogue sentence included in the dialogue history and each word of the first candidate group; and generating a grammar network by combining the first candidate group and the second candidate group.

According to another aspect of the present invention, there is provided an apparatus for speech recognition including: a feature extraction unit extracting features from a user's voice and generating a feature vector string; a grammar network generation unit generating a grammar network by activating a semantic map and an acoustic map by using contents of a dialogue most recently spoken, whenever the user speaks; a loading unit loading the grammar network generated by the grammar network generation unit; and a searching unit searching the grammar network loaded in the loading unit, by using the feature vector string, and generating a candidate recognition sentence formed of a word string matching the feature vector string.

According to another aspect of the present invention, there is provided a method of speech recognition including: extracting features from a user's voice and generating a feature vector string; generating a grammar network by activating a semantic map and an acoustic map by using contents of a dialogue most recently spoken, whenever the user speaks; loading the grammar network; and searching the loaded grammar network, by using the feature vector string, and generating a candidate recognition sentence formed of a word string matching the feature vector string.

According to another aspect of the present invention, there is provided at least one computer readable medium storing instructions that control at least one processor for executing a method of generating a grammar network for speech recognition, wherein the method includes: forming a semantic map by clustering words forming each dialogue sentence included in a dialogue sentence corpus depending on semantic correlation; forming an acoustic map by clustering words forming each dialogue sentence included in the dialogue sentence corpus depending on acoustic similarity; activating the semantic map and generating a first candidate group formed of a plurality of words having the semantic correlation extracted for each word forming a dialogue sentence included in a dialogue history performed between a system and a user; activating the acoustic map and generating a second candidate group formed of a plurality of words having an acoustic similarity extracted for each word forming the dialogue sentence included in the dialogue history and each word of the first candidate group; and generating a grammar network by combining the first candidate group and the second candidate group.

According to another aspect of the present invention, there is provided at least one computer readable medium storing instructions that control at least one processor for executing a method of speech recognition, wherein the method includes: extracting features from a user's voice and generating a feature vector string; generating a grammar network by activating a semantic map and an acoustic map by using contents of a dialogue most recently spoken, whenever the user speaks; loading the grammar network; and searching the loaded grammar network, by using the feature vector string, and generating a candidate recognition sentence formed of a word string matching the feature vector string.

According to another aspect of the present invention, there is provided a method of speech recognition including: extracting features from a user's voice and generating a feature vector string; generating a grammar network by activating a semantic map and an acoustic map by using contents of a dialogue spoken by a user; and searching the grammar network, by using the feature vector string, and generating a candidate recognition sentence formed of a word string matching the feature vector string.

According to another aspect of the present invention, there is provided at least one computer readable medium storing instructions that control at least one processor for executing a method of speech recognition, wherein the method includes: extracting features from a user's voice and generating a feature vector string; generating a grammar network by activating a semantic map and an acoustic map by using contents of a dialogue spoken by a user; and searching the grammar network, by using the feature vector string, and generating a candidate recognition sentence formed of a word string matching the feature vector string.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
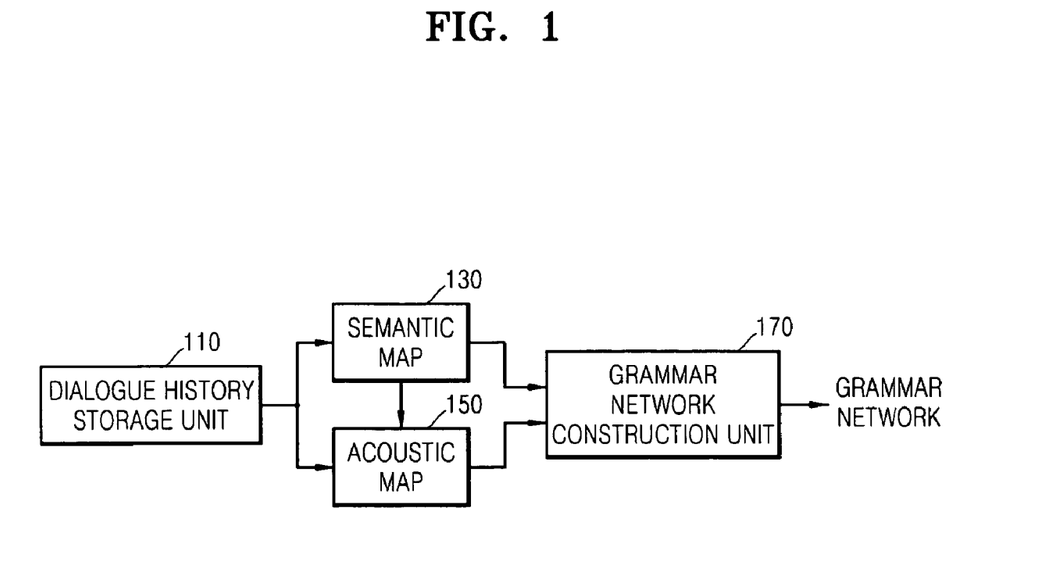
FIG. 1 is a block diagram illustrating a structure of an apparatus for generating a grammar network for speech recognition according to an exemplary embodiment of the present invention.

FIG. 1 is a block diagram illustrating a structure of an apparatus for generating a grammar network for speech recognition according to an exemplary embodiment of the present invention, and includes a dialogue history storage unit 110, a semantic map 130, an acoustic map 150, and a grammar network construction unit 170.

Referring to FIG. 1, the dialogue history storage unit 110 stores a dialogue history between a virtual machine or computer having a speech recognition function (hereinafter referred to as a 'system') and a user as dialogue progresses up to and including a preset number of times the source (system or user) of the dialogue changes. According to this, the dialogue history stored in the dialogue history storage unit 110 can be updated as a dialogue between the system and the user progresses. For example, the dialog history includes at least one combination among a plurality of candidate recognition results of a user's previous voice input provided from a searching unit 370 of FIG. 3, a final recognition result of the user's previous voice input provided from an utterance verification unit 380 of FIG. 3, a reutterance requesting message provided from a reutterance request unit 390 of FIG. 3, and a system's previous utterance sentence.

The semantic map 130 is a map formed by clustering word-like units depending on semantic correlation. The semantic map 130 is activated by word-like units forming a latest dialogue sentence in the dialogue history stored in the dialogue history storage unit 110. The semantic map 130 extracts at least one or more word-like units having high semantic correlations for each word-like unit in the latest dialogue sentence, and generates a first candidate group formed of a plurality of word-like units extracted for each word-like unit in the latest dialogue sentence.

The acoustic (sound) map 150 is a map formed by clustering word-like units depending on acoustic similarity. The sound map 150 is activated by word-like units activated by the semantic map 130 and the word-like units forming a latest dialogue sentence in the dialogue history stored in the dialogue history storage unit 110. The acoustic map 150 extracts at least one or more acoustically similar word-like units for each word-like unit in the latest dialogue sentence, and generates a second candidate group formed of a plurality of word-like units extracted for each word-like unit in the latest dialogue sentence.

In the semantic map 130 and the acoustic map 150, a dialogue sentence of the user recognized most recently by the computer and a dialogue sentence uttered most recently by the computer among the dialogue history stored in the dialogue history storage unit 110 may be received after being separated into respective word-like units.

The grammar network construction unit 170 builds a grammar network by combining randomly the word-like units included in the first candidate group provided by the semantic map 130 and the word-like units included in the second candidate group provided by the acoustic map 150 or by extracting from a corpus using a variety of methods the word-like units included in the first candidate group provided by the semantic map 130 and the word-like units included in the second candidate group provided by the acoustic map 150.

Figure 2:
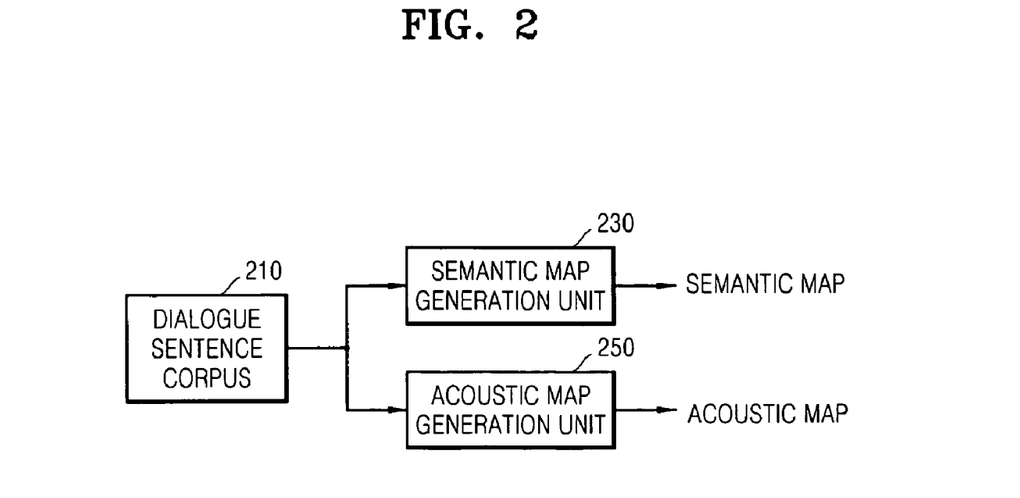
FIG. 2 is a block diagram explaining an exemplary process of generating an acoustic map and a semantic map illustrated in FIG. 1.

FIG. 2 is a block diagram explaining a process of generating the semantic map 130 and the acoustic map 150 illustrated in FIG. 1, and includes a dialogue sentence corpus 210, a semantic map generation unit 230, and an acoustic map generation unit 250.

The dialogue sentence corpus 210 stores all dialogue contents that can be used between a system and a user or between persons, by arranging the contents as sequential dialogue sentences (or partial sentences) in a database. At this time, it is also possible to form dialogue sentences for each domain and store the sentences. Also, a variety of usages of each word may be included in the forming of a dialogue sentence. Here, the word-like unit is a word formed of one or more syllables or a string of word. The word-like unit serves as a basic element forming each dialogue sentence, and the word-like unit is comprised of a single meaning and a single pronunciation. Accordingly, unless the meaning and pronunciation is maintained, the word-like unit cannot be divided further or cannot be combined with other elements. Also, only one pair of an identical meaning and an identical pronunciation is defined. Meanwhile, when words having identical pronunciation have meanings even slightly different from each other, for example, homonyms, homophones, homographs, and polysemies, all of the words are arranged and defined as different elements. Also, when words having the same meaning have pronunciations even slightly different from each other, for example, dialectics and abbreviations, all are arranged and defined as different elements.

The semantic map generation unit 230 selects one dialogue sentence sequentially in relation to the dialogue contents stored in the dialogue sentence corpus 210. The semantic map generation unit 230 sets at least one dialogue sentence positioned at a point of time previous to the selected dialogue sentence, and at least one dialogue sentence positioned at a point of time after the selected dialogue sentence, as training units. In relation to the set training units, it is determined that word-like units occurring adjacent to each word-like unit have high semantic correlations. By considering semantic correlations, clustering or classifier training for all dialogue sentences included in the dialogue sentence corpus 210, semantic map generation is performed so that a semantic map is generated. At this time, for the clustering or the classifier training, a variety of algorithms, such as a Kohonen network, vector quantization, a Bayesian network, an artificial neural network, and a Bayesian tree, can be used.

Meanwhile, a method of quantitatively measuring a semantic distance between word-like units in the semantic map generation unit 230 will now be explained. Basically, a co-occurrence rate is employed for distance measuring that is used when a semantic map is generated from the dialogue sentence corpus 210 through the semantic map generation unit 230. The co-occurrence rate will now be explained further. When taking a sentence (or part of a sentence) from the dialogue sentence corpus 210 referring to a current point in time t as a center, a window is defined to include a sentence in t−1 to a sentence in t+1 including the sentence in t. In this case, one window includes three sentences. Also, t−1 can be t−n and t+1 can be t+n. At this time, n may be any value from 1 to 7, but is not limited to these numbers. The reason why the maximum number is 7 is that the limit of the short-period memory of a human being is 7 units.

Word-like units co-occurring in one window are counted respectively. For example, a predetermined sentence, "Ye Kuraeyo," is included in a window. Since this sentence includes two word-like units, "Ye (yes)" and "Kuraeyo (right)", and "Ye (yes): Kuraeyo (right)" is counted once and also, "Kuraeyo (right): Ye (yes)" is counted once. The frequencies of these co-occurrences are continuously recorded and then finally counted in relation to the entire contents of the corpus. That is, a counting operation identical to the above is performed each time with moving the window of a constant size in relation to the entire contents of the corpus by one step with respect to time. If the counting operation in relation to the entire contents of the corpus is finished, the count value (integer value) in relation to each pair of the entire plurality of word-like units is obtained. If this integer value is divided by the total sum of all count values, each pair of word-like units will have a fractional value between 0.0 and 1.0. The distance between a predetermined word-like unit A and another word-like unit B will be a predetermined fractional value. If this value is 0.0, it means that the two word-like units never occurred together, and if this value is 1.0, it means that only this pair exists in the entire contents of the corpus and other possible pairs have never occurred. As a result, the values for most pairs will be arbitrary values less than 1.0 and greater than 0.0, and if values of all pairs are added, the result will be 1.0.

The co-occurrence rate described above corresponds to what is obtained by converting all-important semantic relations defined in ordinary linguistics into quantitative amounts. That is, antonyms, synonyms, similar words, super concept words, sub concept words, and part concept words are all included and even interjections frequently occurring are included. Especially in the case of interjections, they have bigger values of semantic distance for a bigger variety of word-like units. Meanwhile, in the case of articles they will occur adjacent to only predetermined sentence types. That is, in the case of the Korean language, articles will occur only after nouns. In conventional technology, linguistic knowledge can be defined one by one manually. However, according to the present invention, if dialogue sentences are correctly collected in the dialogue sentence corpus 210, words will be automatically arranged and the quantitative distance can be measured. As a result, a grammar network appropriate to the flow of a dialogue, that is, the discourse is generated so that utterance by a user can be predicted.

The acoustic map generation unit 250 selects one dialogue sentence sequentially in relation to the dialogue sentences stored in the dialogue sentence corpus 210. The acoustic map generation unit 250 matches each word-like unit included in the selected dialogue sentence with at least one or more word-like units having identical pronunciation but having different meaning according to usage, or at least one or more word-like units having a different pronunciation but having identical meaning. Then, with respect to acoustic similarity, semantic or pronunciation indexes are given to the at least one or more word-like units matched with one word-like unit and then, by performing clustering or classifier training, an acoustic map is generated. The acoustic map is generated by performing clustering or classifier training in the same manner as in the semantic map generation unit 230. As an example of a method of quantitatively measuring an acoustic distance between word-like units in the acoustic map generation unit 250, a method is disclosed in Korean Patent Laid Open Application No. 2001-0073506 (title of the invention: A method of measuring a global similarity degree between Korean character strings).

An example of a semantic map generated in the semantic map generation unit 230 and an acoustic map generated in the acoustic map generation unit 250 will now be explained assuming that the dialogue sentence corpus 210 includes the usage examples as the following Table 1:

TABLE 1

Nadal, Natgari, Nannoko Giyeogja, Byeongi Nasda, Natgwa Bam, Jigwiga Natda, Museun Nacheuro Bona, Agireul Nata, Saekkireul Nata, Baetago Badae, Baega Apeuda, Baega Masita, Maltada, Malgwa Geul, Beore Ssoida, Beoreul Batda, Nuni Apeuda, Nuni Onda, Bami Masita, Bami Eudupda, Dariga Apeuda, Darireul Geonneoda, Achime Boja, Achimi Masisda.

A total of 45 word-like units can be used to form the following Table 2:

TABLE 2

| Nad (grain)      | Al (egg)                          |
|                  | Gari (stack)                      |
| Nas (sickle)     | Nota (put) Giyeog (Giyeog) Ja (letter) |
| Nad (recover)    | Byeong (sickness)                 |
| Nad (day)        | Bam (night)                       |
| Nad (low)        | Jigwi (position)                  |
| Nad (face)       | Boda (see)                        |
| Nad (piece)      | Gae (unit)                        |
| Nad (bear)       | Agi (baby)                        |
|                  | Saekki (young)                    |
|                  | Al (egg)                          |
| Bae (ship)       | Bada (sea)                        |
| Bae (stomach)    | Apeuda (sick)                     |
| Bae (pear)       | Masisda (tasty)                   |
| Mal (horse)      | Tada (ride)                       |
| Mal (language)   | Keul (writing)                    |
| Beol (bee)       | Ssoda (bite)                      |
| Beol (punishment)| Badda (get)                       |
| Nun (eye)        | Apeuda (sick)*                    |
| Nun (snow)       | Oda (come)                        |
| Bam (chestnut)   | Masisda (tasty)*                  |
| Bam (night)      | Eudupda (dark)                    |
| Dari (leg)       | Apeuda (sick)**                   |
| Dari (bridge)    | Geonneoda (cross)                 |
| Achim (morning)  | Boda (see)*                       |
| Achim (breakfast)| Masisda (tasty)**                 |

(Here, * and ** indicate redundancy)

By using the word-like units shown in Table 2, an acoustic map containing relations between pronunciations and polymorphemes as the following Table 3 and a semantic map containing relations between polymorphemes as shown in Table 4 are generated.

TABLE 3

/Gae/ Gae (unit)
/Geul/ Geul (writing)
/Nad/ Nad (grain) Nas (recover) Nad (day) Nad (low) Nad (face) Nad (piece) Nad (bear)
/Nun/ Nun (eye) Nun (snow)
/Mal/ Mal (horse) Mal (language)
/Bam/ Bam (chestnut) Bam (night)
/Bae/ Bae (ship) Bae (stomach) Bae (pear)
/Beol/ Beol (bee) Beol (punishment)
/Byeong/ Byeong (sickness)

TABLE 3-continued

/Al/ Al (egg)
/Ja/ Ja (letter)
/Gari/ Gari (stack)
/Gyeok/ Gyeok (Gyeok)
/Nota/ Nota (put) /Nodda/Nodda/
/Dari/ Dari (leg) Dari (bridge)
/Bada/ Bada (sea)
/Badda/ Badda (get) /Badda/
/Boda/ Boda (see)
/Jigwi/ Jigwi (position) /Jigi/
/Saekki/ Saekki (young)
/Agi/ Agi (baby)
/Achim/ Achim (morning) Achim (breakfast)
/Oda/ Oda (come)
/Tada/ Tada (ride)
/Ssoda/ Ssoda (bite)
/Geonneoda/ Geonneoda
/Masisda/ Masisda (tasty) /Masidda/
/Apeuda/ Apeuda (sick) /Apuda/
/Eodupda/ Eodupda (dark) /Eodupda

TABLE 4

Nad (grain) - Al (egg)
Nad (grain) - Gari (stack)
Nad (sickle) - Nota (put) . . . Gyeok (Gyeok) - Ja (letter)
Byeong (sickness) - Nas (recover)
Nad (day) = Bam (night)
Jigwi (position) - Nad (low)
Nad (face) - Boda (see)
Nad (piece) - Gae (unit)
Agi (baby) - Nad (bear)
Saekki (young) - Nad (bear)
Al (egg) - Nad (bear)
Bae (ship) = Bada (sea)
Bae (stomach) - Apeuda (sick)
Bae (pear) - Masisda (tasty)
Mal (horse) - Tada (ride)
Mal (language) = Geul (writing)
Beol (bee) - Ssoda (bite)
Beol (punishment) - Badda (get)
Nun (eye) - Apeuda (sick)
Nun (snow) - Oda (come)
Bam (chestnut) - Masisda (tasty)
Bam (night) - Eodupda (dark)
Dari (leg) - Apeuda (sick)
Dari (bridge) - Geonneoda (cross)
Achim (morning) - Boda (see)
Achim (breakfast) - Masisda (tasty)

In Table 3, '/•/' indicates a pronunciation, and in Table 4, '-' indicates an adjacent relation, '=' indicates a relation that has nothing to do with an utterance order, and ' . . . ' indicates a relation that may be adjacent or may be skipped.

Figure 3:
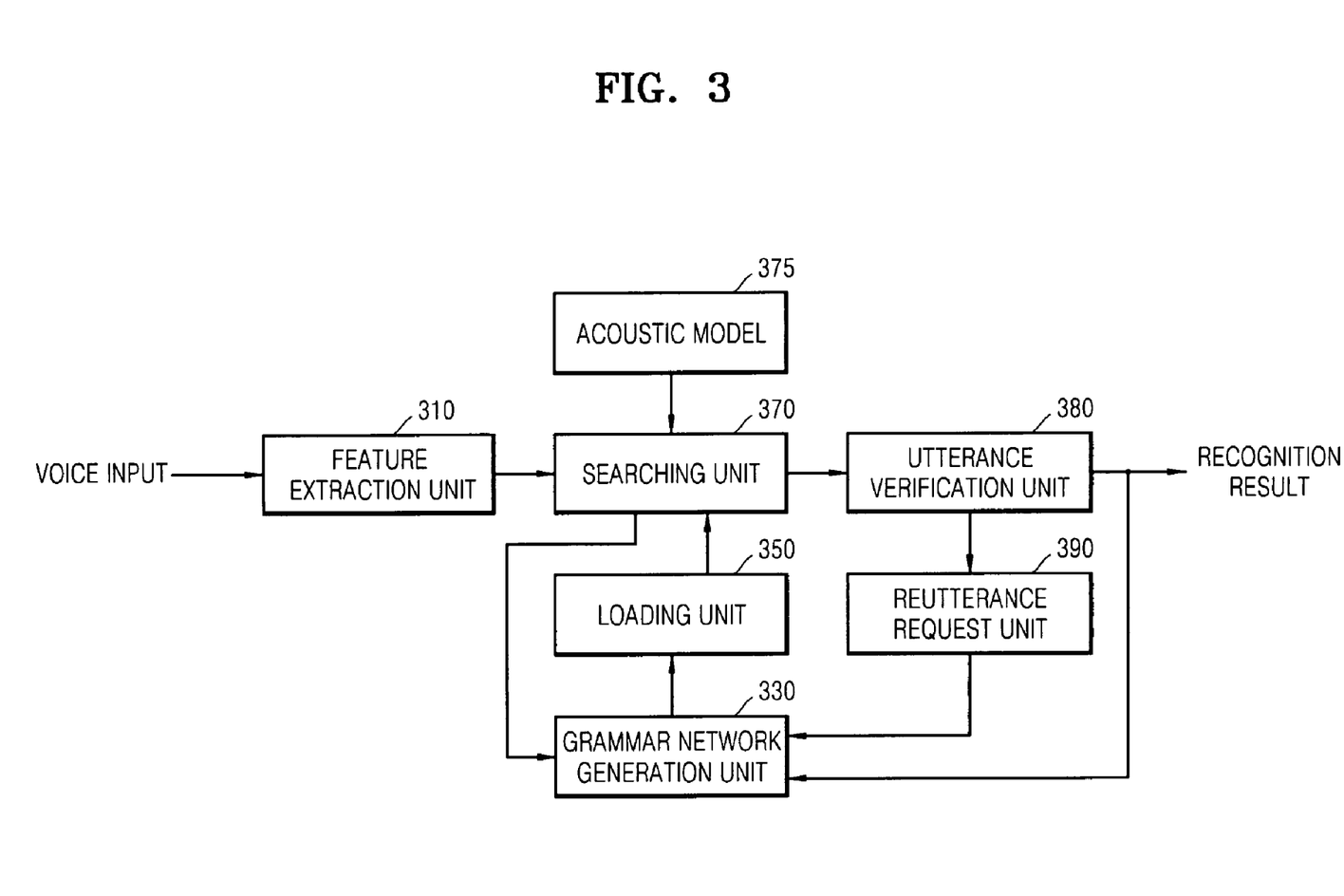
FIG. 3 is a block diagram illustrating a structure of a dialogue speech recognition apparatus according to an exemplary embodiment of the present invention.

FIG. 3 is a block diagram illustrating a structure of a dialogue speech recognition apparatus according to an exemplary embodiment of the present invention. The dialogue speech recognition apparatus includes a feature extraction unit 310, a grammar network generation unit 330, a loading unit 350, a searching unit 370, an acoustic model 375, an utterance verification unit 380, and a user reutterance request unit 390.

Referring to FIG. 3, the characteristic extraction unit 310 receives a voice signal from a user, and converts the voice signal into a feature vector string useful for speech recognition, such as a Mel-frequency Cepstral coefficient.

The grammar network generation unit 330 receives the dialogue history most recently generated and generates a grammar network by activating the semantic map (130 of FIG. 1) and the acoustic map (150 of FIG. 1) using the received dialogue history. The dialog history includes at least one combination among a plurality of candidate recognition results of a user's previous voice input provided from a searching unit 370, a final recognition result of the user's previous voice input provided from an utterance verification unit 380, a reutterance requesting message provided from a reutterance request unit 390, and a system's previous utterance sentence. The detailed structure and related specific operations of the grammar network generation unit 330 are the same as described above with reference to FIG. 1.

The loading unit 350 expresses phoneme combination information in relation to phonemes included in the grammar network generated in the grammar network generation unit 330, in a structure such as a context free grammar and loads it into the searching unit 370.

The searching unit 370 receives the feature vector string in relation to the currently input voice signal from the feature extraction unit 310, and performs a Viterbi search for the grammar network formed of phoneme models extracted from the acoustic model 375, based on the phoneme combination information loaded from the loading unit 350, in order to find candidate recognition sentences (N-Best) formed of matching word strings.

The utterance verification unit 380 performs utterance verification for the candidate recognition sentences provided by the searching unit 370. At this time, without using a separate language model, the utterance verification can be performed by using the grammar network generated according to an exemplary embodiment of the present invention. That is, if similarity calculated in relation to one among the candidate recognition sentences by using the grammar network is equal to or greater than a threshold, it is determined that the utterance verification of the current user voice input is successful. If each similarity calculated in relation to all the candidate recognition sentences is less than the threshold, it is determined that the utterance verification of the current user voice input is failed. In relation to the utterance verification, the method disclosed in the Korean Patent Application No. 2004-0115069, which corresponds to U.S. patent application Ser. No. 11/263,826 (title of the invention: method and apparatus for determining the possibility of pattern recognition of a time series signal), can be applied.

When utterance verification is failed for all candidate recognition sentences in the utterance verification unit 380, the user reutterance request unit 390 may display text requesting the user to utter again, on a display (not shown), such as an LCD display, or may generate a system utterance sentence requesting the user to utter again through a speaker (not shown).

Figure 4:
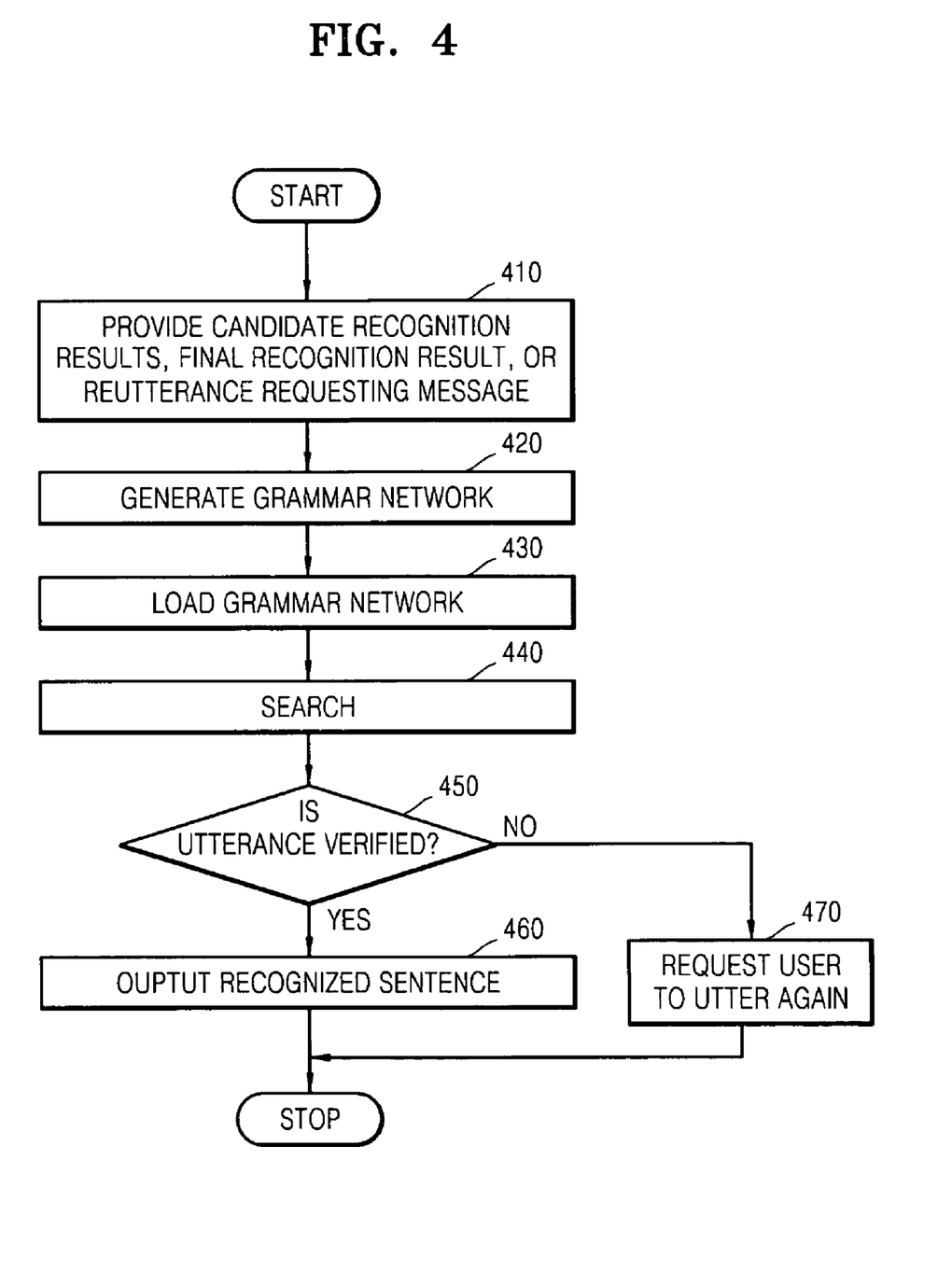
FIG. 4 is a flowchart illustrating of a speech recognition method according to an exemplary embodiment of the present invention.

FIG. 4 is a flowchart illustrating the operations of a speech recognition method according to an exemplary embodiment of the present invention.

Referring to FIG. 4, a dialogue history most recently generated is received in operation 410. The dialogue history includes a first dialogue sentence that is spoken most recently by the user and recognized by the system, and a second dialogue sentence that is spoken most recently by the system. The first dialogue sentence includes at least one combination of a plurality of candidate recognition results of a user's previous voice input provided from a searching unit 370 and a final recognition result of the user's previous voice input provided from an utterance verification unit 380. The second dialogue sentence includes at least one combination of a reutterance requesting message provided from a reutterance request unit 390, and a system's previous utterance sentence.

In operation 420, the semantic map (130 of FIG. 1) and the acoustic map (150 of FIG. 1) are activated by using the dialogue history received in operation 410, and a grammar network is generated by combining randomly or in a variety of ways extracted from the corpus, a plurality of word-like units included in a first candidate group provided by the semantic map 130, and a plurality of word-like units included in a second candidate group provided by the acoustic map 150.

In operation 430, phoneme combination information in relation to phonemes included in the grammar network generated in operation 420, is expressed in a structure such as a context free grammar, and is loaded for a search, such as a Viterbi search.

In operation 440, the Viterbi search is performed for the grammar network formed of phoneme models extracted from the acoustic model 375, based on the phoneme combination information loaded in operation 430 in relation to the feature vector string for the current voice signal, which is input in operation 410, and by doing so, candidate recognition sentences (N-Best) formed of matching word strings are searched for.

In operation 450, it is determined whether or not there is a candidate recognition sentence among the candidate recognition sentences, for which utterance verification is successful according to the search result of operation 440.

In operation 460, if the determination result of the operation 450 indicates that there is a candidate recognition sentence whose utterance verification is successful, the recognition sentence is output of the system, and in operation 470, if there is no candidate recognition sentence whose utterance verification is successful, the user is requested to utter again.

In addition to the above-described exemplary embodiments, exemplary embodiments of the present invention can also be implemented by executing computer readable code/instructions in/on a medium, e.g., a computer readable medium. The medium can correspond to any medium/media permitting the storing and/or transmission of the computer readable code.

The computer readable code/instructions can be recorded/transferred in/on a medium in a variety of ways, with examples of the medium including magnetic storage media (e.g., ROM, floppy disks, hard disks, etc.), optical recording media (e.g., CD-ROMs, or DVDs), random access memory media, and storage/transmission media such as carrier waves. Examples of storage/transmission media may include wired or wireless transmission (such as transmission through the Internet). The medium/media may also be a distributed network, so that the computer readable code/instructions is stored/transferred and executed in a distributed fashion. The computer readable code/instructions may be executed by one or more processors.

According to the present invention as described above, dialogue speech recognition is performed by using a grammar network for speech recognition adaptively and automatically generated by reflecting the contents of previous dialogues such that even when the user utters outside a standard grammar structure, the contents can be easily recognized. Accordingly, dialogue can be smoothly and naturally performed.

Furthermore, as a grammar network generator of a conversational or dialogue-driven speech recognition apparatus, the present invention can replace the n-gram, SAPI, VXML, and SALT methods that are conventional technologies, and in addition, it enables a higher dialogue recognition rate through a user speech prediction function.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. An apparatus for generating a grammar network for speech recognition comprising:
   a dialogue history storage unit to store a dialogue history between a system and a user;
   a semantic map formed by clustering words forming each dialogue sentence included in a dialogue sentence corpus depending on semantic correlation, and generating a first candidate group formed of a plurality of words having the semantic correlation extracted for each word forming a dialogue sentence provided from the dialogue history storage unit;
   an acoustic map formed by clustering words forming each dialogue sentence included in the dialogue sentence corpus depending on acoustic similarity, and generating a second candidate group formed of a plurality of words having an acoustic similarity extracted for each word forming the dialogue sentence provided from the dialogue history storage unit and each word of the first candidate group; and
   a grammar network construction unit to construct a grammar network by randomly combining words included in the first candidate group and the words included in the second candidate group.

2. The apparatus of claim 1, wherein the dialogue history storage unit stores contents of a latest dialogue, and the stored contents are updated as the dialogue proceeds.

3. The apparatus of claim 1, wherein the semantic map and the acoustic map are activated by a dialogue sentence most recently recognized by the system and a dialogue sentence most recently output by the system among the dialogue history stored in the dialogue history storage unit.

4. The apparatus of claim 1, wherein each word is a basic element forming each dialogue sentence, each word is a word or a word string formed of one or more syllables, and each word comprises a single meaning and a single pronunciation as a pair.

5. The apparatus of claim 1, wherein the dialogue sentence corpus is obtained by arranging all contents available between the system and the user, as sequential dialogue sentences, comprising a variety of usages, in the form of a database.

6. A method of generating a grammar network for speech recognition comprising:
   forming a semantic map by clustering words forming each dialogue sentence included in a dialogue sentence corpus depending on semantic correlation;
   forming an acoustic map by clustering words forming each dialogue sentence included in the dialogue sentence corpus depending on acoustic similarity;
   activating the semantic map and generating a first candidate group formed of a plurality of words having the semantic correlation extracted for each word forming a dialogue sentence included in a dialogue history performed between a system and a user;
   activating the acoustic map and generating a second candidate group formed of a plurality of words having an acoustic similarity extracted for each word forming the dialogue sentence included in the dialogue history and each word of the first candidate group; and
   generating the grammar network by randomly combining the first candidate group and the second candidate group, wherein the method is performed using a computer.

7. The method of claim 6, wherein the semantic map and the acoustic map are activated whenever words are uttered by the user.

8. The method of claim 6, wherein both the first candidate group of words having semantic correlation and the second candidate group of words having acoustic similarity are formed with words included in a dialogue sentence that have been recognized most recently by the system and words included in a dialogue sentence that have been output most recently by the system.

9. The method of claim 6, wherein each word is a basic element forming each dialogue sentence, each word is a word or a word string formed with of one or more syllables, and each word comprises a single meaning and a single pronunciation as a pair.

10. An apparatus for speech recognition comprising:
    a feature extraction unit to extract features from a user's voice and generating a feature vector string;
    a grammar network generation unit to generate a grammar network by activating a semantic map and an acoustic map by using contents of a dialogue most recently spoken, whenever the user speaks;
    a loading unit to load the grammar network generated by the grammar network generation unit; and
    a searching unit to search the grammar network loaded in the loading unit, by using the feature vector string, and generating a candidate recognition sentence formed of a word string matching the feature vector string,
    wherein the grammar network generation unit comprises:
    a dialogue history storage unit to store a dialogue history between the system and the user;
    a semantic map formed by clustering words forming each dialogue sentence included in a dialogue sentence corpus depending on semantic correlation, and generating a first candidate group formed of a plurality of words having the semantic correlation extracted for each word forming a dialogue sentence provided from the dialogue history storage unit;
    an acoustic map formed by clustering words forming each dialogue sentence included in the dialogue sentence corpus depending on acoustic similarity, and generating a second candidate group formed of a plurality of words having an acoustic similarity extracted for each word forming the dialogue sentence provided from the dialogue history storage unit and each word of the first candidate group; and
    a grammar network construction unit to construct the grammar network by randomly combining words included in the first candidate group and the words included in the second candidate group.

11. The apparatus of claim 10, wherein the dialogue history storage unit stores contents of a latest dialogue, and the stored contents are updated as the dialogue proceeds.

12. The apparatus of claim 10, wherein the semantic map and the acoustic map are activated by a dialogue sentence most recently recognized by the system and a dialogue sentence most recently output by the system among the dialogue history stored in the dialogue history storage unit.

13. The apparatus of claim 10, wherein each word is a basic element forming each dialogue sentence, each word is a word or a word string formed with one or more syllables, and each word comprises a single meaning and a single pronunciation as a pair.

14. The apparatus of claim 10, wherein the dialogue sentence corpus is obtained by arranging all contents available between the system and the user, as sequential dialogue sentences, comprising a variety of usages, in the form of a database.

15. A method of speech recognition comprising:
extracting features from a user's voice and generating a feature vector string;
generating a grammar network by activating a semantic map and an acoustic map by using contents of a dialogue most recently spoken, whenever the user speaks;
loading the grammar network; and
searching the loaded grammar network, by using the feature vector string, and generating a candidate recognition sentence formed of a word string matching the feature vector string,
wherein the generation of the grammar network comprises:
forming a semantic map by clustering words forming each dialogue sentence included in a dialogue sentence corpus depending on semantic correlation;
forming an acoustic map by clustering words forming each dialogue sentence included in the dialogue sentence corpus depending on acoustic similarity;
activating the semantic map and generating a first candidate group formed of a plurality of words having the semantic correlation extracted for each word forming a dialogue sentence included in a dialogue history performed between a system and a user;
activating the acoustic map and generating a second candidate group formed of a plurality of words having an acoustic similarity extracted for each word forming the dialogue sentence included in the dialogue history and each word of the first candidate group; and
generating the grammar network by randomly combining the first candidate group and the second candidate group.

16. The method of claim 15, wherein both the first candidate group of words having semantic correlation and the second candidate group of words having acoustic similarity are formed with words included in a dialogue sentence that has been recognized most recently by the system and words included in a dialogue sentence that has been output most recently by the system.

17. The method of claim 15, wherein each word is a basic element forming each dialogue sentence, and is a word or a word string formed of one or more syllables, and comprises as a pair of a single meaning and a single pronunciation.

18. At least one computer readable storage medium storing instructions that control at least one processor for executing a method of generating a grammar network for speech recognition, wherein the method comprises:
forming a semantic map by clustering words forming each dialogue sentence included in a dialogue sentence corpus depending on semantic correlation;
forming an acoustic map by clustering words forming each dialogue sentence included in the dialogue sentence corpus depending on acoustic similarity;
activating the semantic map and generating a first candidate group formed of a plurality of words having the semantic correlation extracted for each word forming a dialogue sentence included in a dialogue history performed between a system and a user;
activating the acoustic map and generating a second candidate group formed of a plurality of words having an acoustic similarity extracted for each word forming the dialogue sentence included in the dialogue history and each word of the first candidate group; and
generating the grammar network by randomly combining the first candidate group and the second candidate group.

19. At least one computer readable storage medium storing instructions that control at least one processor for executing a method of speech recognition, wherein the method comprises:
extracting features from a user's voice and generating a feature vector string;
generating a grammar network by activating a semantic map and an acoustic map by using contents of a dialogue most recently spoken, whenever the user speaks;
loading the grammar network; and
searching the loaded grammar network, by using the feature vector string, and generating a candidate recognition sentence formed of a word string matching the feature vector string,
wherein the generation of the grammar network comprises:
forming the semantic map by clustering words forming each dialogue sentence included in a dialogue sentence corpus depending on semantic correlation;
forming the acoustic map by clustering words forming each dialogue sentence included in the dialogue sentence corpus depending on acoustic similarity;
activating the semantic map and generating a first candidate group formed of a plurality of words having the semantic correlation extracted for each word forming a dialogue sentence included in a dialogue history performed between a system and a user;
activating the acoustic map and generating a second candidate group formed of a plurality of words having an acoustic similarity extracted for each word forming the dialogue sentence included in the dialogue history and each word of the first candidate group; and
generating the grammar network by randomly combining the first candidate group and the second candidate group.

20. A method of speech recognition comprising:
extracting features from a user's voice and generating a feature vector string;
generating a grammar network by activating a semantic map and an acoustic map by using contents of a dialogue spoken by a user; and
searching the grammar network, by using the feature vector string, and generating a candidate recognition sentence formed of a word string matching the feature vector string,
wherein the generation of the grammar network comprises:
forming the semantic map by clustering words forming each dialogue sentence included in a dialogue sentence corpus depending on semantic correlation;
forming the acoustic map by clustering words forming each dialogue sentence included in the dialogue sentence corpus depending on acoustic similarity;
activating the semantic map and generating a first candidate group formed of a plurality of words having the semantic correlation extracted for each word forming a dialogue sentence included in a dialogue history performed between a system and a user;
activating the acoustic map and generating a second candidate group formed of a plurality of words having an acoustic similarity extracted for each word forming the dialogue sentence included in the dialogue history and each word of the first candidate group; and
generating the grammar network by randomly combining the first candidate group and the second candidate group.

21. At least one computer readable storage medium storing instructions that control at least one processor for executing a method of speech recognition, wherein the method comprises:

extracting features from a user's voice and generating a feature vector string;

generating a grammar network by activating a semantic map and an acoustic map by using contents of a dialogue spoken by a user; and searching the grammar network, by using the feature vector string, and generating a candidate recognition sentence formed of a word string matching the feature vector string, wherein the generation of the grammar network comprises:

forming the semantic map by clustering words forming each dialogue sentence included in a dialogue sentence corpus depending on semantic correlation;

forming the acoustic map by clustering words forming each dialogue sentence included in the dialogue sentence corpus depending on acoustic similarity;

activating the semantic map and generating a first candidate group formed of a plurality of words having the semantic correlation extracted for each word forming a dialogue sentence included in a dialogue history performed between a system and a user;

activating the acoustic map and generating a second candidate group formed of a plurality of words having an acoustic similarity extracted for each word forming the dialogue sentence included in the dialogue history and each word of the first candidate group; and generating the grammar network by randomly combining the first candidate group and the second candidate group.

* * * * *